United States Patent
Mene et al.

(10) Patent No.: US 12,061,841 B2
(45) Date of Patent: Aug. 13, 2024

(54) DYNAMIC DISPLAY ACCOMMODATIONS FOR MULTIPLE VOICE COMMANDS

(71) Applicant: International Business Machines Corporation, Armonk, NY (US)

(72) Inventors: Atul Mene, Morrisville, NC (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/455,553

(22) Filed: Nov. 18, 2021

(65) Prior Publication Data
US 2023/0153060 A1    May 18, 2023

(51) Int. Cl.
*G06F 3/16* (2006.01)
*G06F 9/451* (2018.01)

(52) U.S. Cl.
CPC .............. *G06F 3/167* (2013.01); *G06F 9/451* (2018.02)

(58) Field of Classification Search
CPC ................................. G06F 3/167; G06F 9/451
See application file for complete search history.

(56) References Cited

U.S. PATENT DOCUMENTS

| | | | |
|---|---|---|---|
| 9,489,171 B2 | 11/2016 | Klein et al. | |
| 9,582,246 B2 | 2/2017 | Klein et al. | |
| 9,900,171 B2 | 2/2018 | Guedalia et al. | |
| 10,146,743 B2 | 12/2018 | Zhang et al. | |
| 10,938,830 B2 | 3/2021 | Fox et al. | |
| 10,944,588 B2 | 3/2021 | Iyengar et al. | |
| 2011/0197263 A1* | 8/2011 | Stinson, III | G06F 3/017 715/753 |
| 2014/0200896 A1 | 7/2014 | Lee | |
| 2016/0011854 A1* | 1/2016 | Furumoto | G10L 15/22 704/249 |
| 2016/0034253 A1 | 2/2016 | Bang | |

(Continued)

FOREIGN PATENT DOCUMENTS

| | | |
|---|---|---|
| CN | 103945250 A | 7/2014 |
| CN | 113035185 A | 6/2021 |

OTHER PUBLICATIONS

Grabham, "Amazon Echo Show 5 review: Honey, I shrunk the screen", Pocket-lint, Apr. 28, 2020, 17 pages, <https://www.pocket-lint.com/smart-home/reviews/amazon/148502-echo-show-5-review>.

(Continued)

*Primary Examiner* — Andrey Belousov
(74) *Attorney, Agent, or Firm* — Daniel M. Yeates

(57) ABSTRACT

A computer-implemented method allocates screen space to two or more voice commands concurrently. The method includes receiving, by a voice controlled device (VCD), two or more voice commands including a first voice command and a second voice command, where a result for each of the voice commands can be displayed on a screen associated with the VCD. The method further includes allocating a portion of the screen for each command including, a first allocation for a first result of the first command and a second allocation for a result of the second command. The method also includes displaying, based on the allocating, the first result and the second result simultaneously on the screen.

18 Claims, 5 Drawing Sheets

(56) References Cited

U.S. PATENT DOCUMENTS

| | | |
|---|---|---|
| 2017/0031652 A1 | 2/2017 | Kam |
| 2017/0256260 A1 | 9/2017 | Jeong |
| 2017/0277513 A1 | 9/2017 | Koga |
| 2018/0247065 A1 | 8/2018 | Rhee et al. |
| 2019/0012142 A1* | 1/2019 | Bang .................... G06F 3/0481 |
| 2020/0177410 A1* | 6/2020 | Iyengar .................. G06F 3/167 |
| 2021/0174797 A1 | 6/2021 | Choi |
| 2021/0182008 A1 | 6/2021 | Kim |

OTHER PUBLICATIONS

VynZ Research, "Global Voice Assistant Market is Set to Reach USD 5,843.8 million by 2024, Observing a CAGR of 27.7% during 2019-2024: VynZ Research", Intrado, Jan. 28, 2020, 8 pages, <https://www.globenewswire.com/news-release/2020/01/28/1976318/0/en/Global-Voice-Assistant-Market-is-Set-to-Reach-USD-5-843-8-million-by-2024-Observing-a-CAGR-of-27-7-during-2019-2024-VynZ-Research.html>.

"Method and system for recalling complete or partial voice command submitted to AI voice assistance system", Published Mar. 12, 2020, ip.com, IPCOM000261525D,5 pages, <https://priorart.ip.com/IPCOM/000261525>.

"Method and system for voice response system to consider a short-term and long-term information about any user while executing any voice command", ip.com, Published Oct. 19, 2018, IPCOM000255904D, 4 pages, <https://priorart.ip.com/IPCOM/000255904>.

"Quantitative Voice Response System to Submit Contextual Relevant Mixed Voice and Body Gestures", ip.com, Published Jun. 14, 2018, IPCOM000254251D, 5 pages, <https://priorart.ip.com/IPCOM/000254251>.

Mell et al., "The NIST Definition of Cloud Computing", Recommendations of the National Institute of Standards and Technology, NIST Special Publication 800-145, Sep. 2011, 7 pages.

Patent Cooperation Treaty PCT, Notification of Transmittal of The International Search Report and The Written Opinion of The International Searching Authority, or The Declaration, Date of mailing Dec. 30, 2022, International application No. PCT/CN2022/123184, 9 pages.

* cited by examiner

DYNAMIC DISPLAY ACCOMMODATIONS FOR MULTIPLE VOICE COMMANDS

BACKGROUND

The present disclosure relates to voice controlled devices and, more specifically, dynamically adjusting a display to accommodate multiple voice commands.

Voice command devices (VCD) are devices that can receive and execute audio commands. They can also be known as voice assistants, artificial intelligence assistants, and the like. VCD can receive the commands, interpret what is received and provide an appropriate response.

SUMMARY

Disclosed is a computer-implemented method to allocate screen space to two or more voice commands concurrently. The method includes receiving, by a voice controlled device (VCD), two or more voice commands including a first voice command and a second voice command, wherein a result for each of the voice commands can be displayed on a screen associated with the VCD. The method further includes allocating a portion of the screen for each command including, a first allocation for a first result of the first command and a second allocation for a result of the second command. The method also includes displaying, based on the allocating, the first result and the second result simultaneously on the screen. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
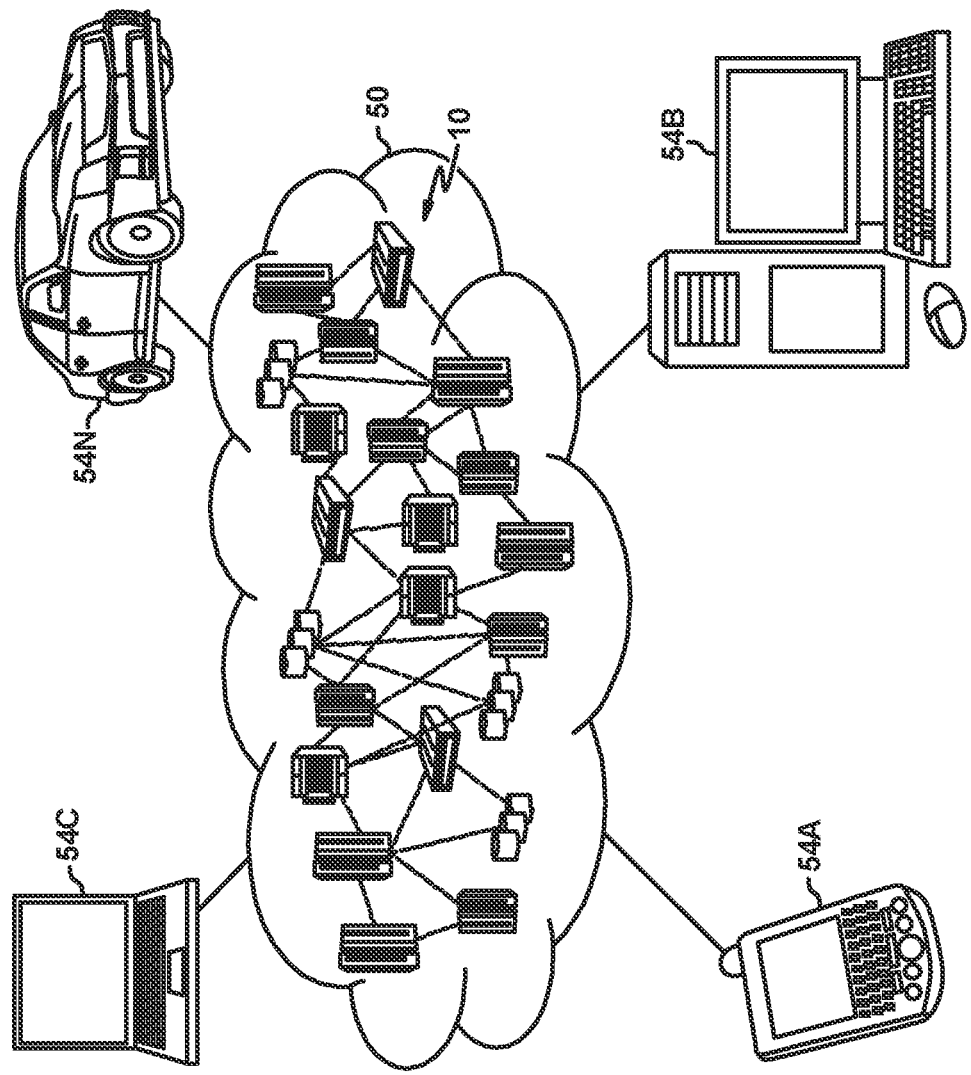
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
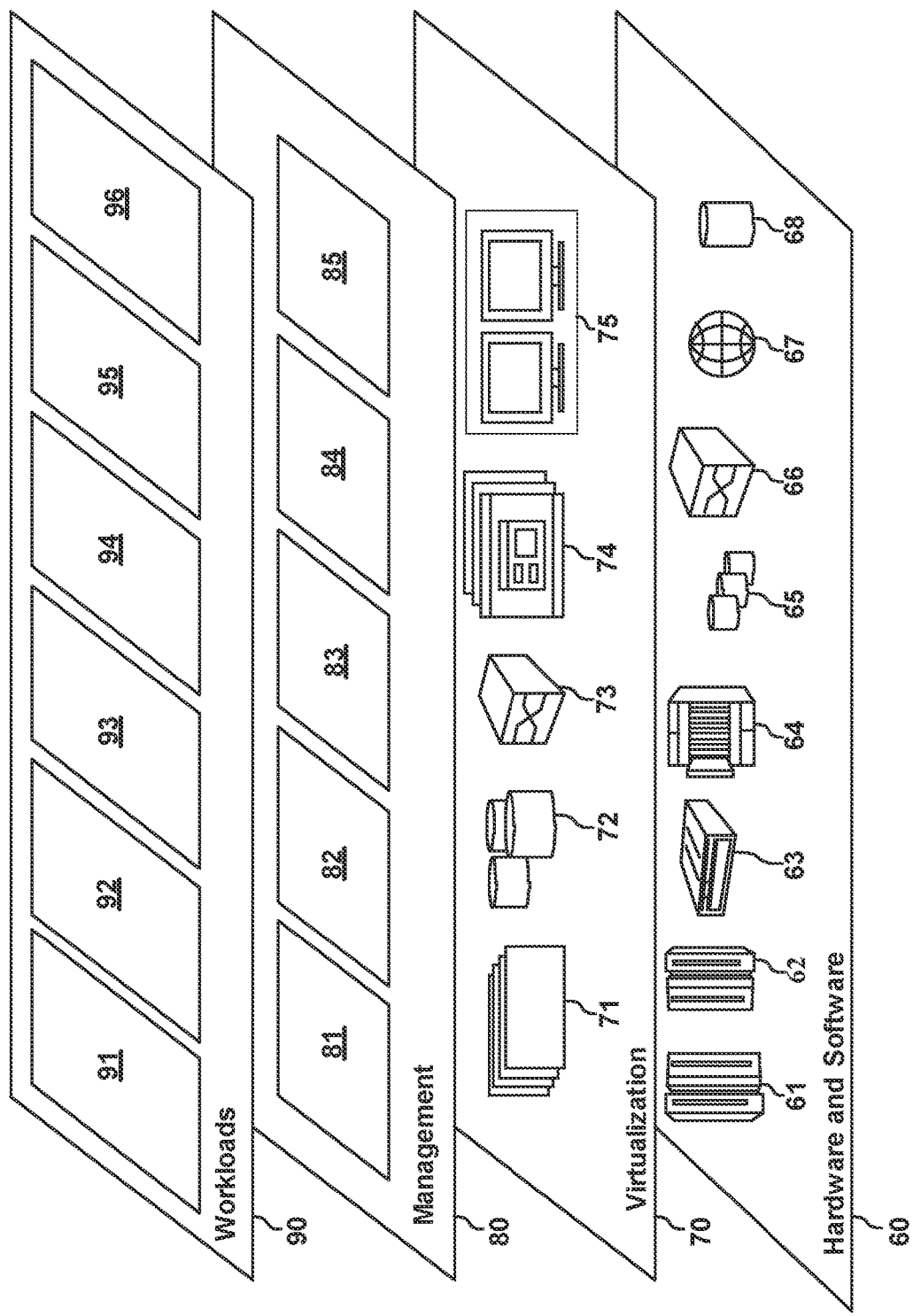
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic display adjustment 96.

Data Processing System in General

Figure 3:
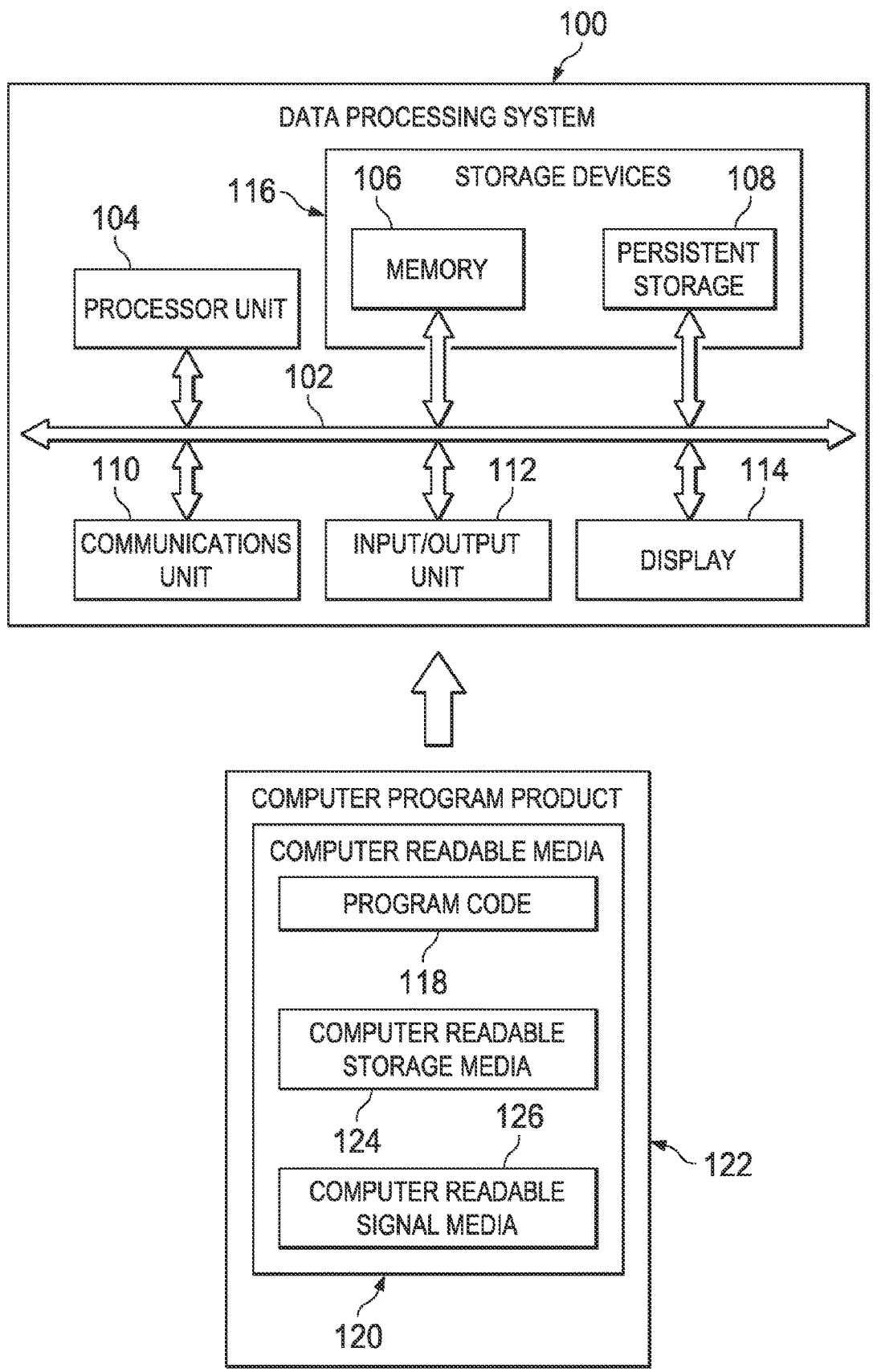
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Voice command devices (VCD) are devices that can receive and execute audio commands. They can also be known as voice assistants, artificial intelligence assistants, and the like. VCD can receive the commands, interpret what is received, and provide an appropriate response. A voice command can be any type of command, such as asking for information, (e.g., directions, weather, etc.) performing a task (e.g., play music, turn on a light, etc.), and the like. In some embodiments, VCD can incorporate a display to execute the command.

At times, one or multiple users can submit multiple commands concurrently. In some embodiments, concurrently can be when a second or subsequent command is received prior to a first command being fully executed (e.g., displayed and secured). Depending on the type of command/request, the VCD may not be able to fully execute each command without a significant delay. This can be caused by limited ability to send information to the user/requestor. Thus, in general, these commands are processed one at a time, and/or some of the commands are dropped.

Embodiments of the present disclosure can execute more than one voice command in close succession. In some embodiments, the results of two of more voice commands can be displayed on a screen/display simultaneously. This allows for the VCD to receive many commands in a single request and/or in close succession, and display the results for some or all, for at least a brief period of time on the display.

Embodiments of the present disclosure include a display manager. In some embodiments, the display manager can dynamically update a display to accommodate the response for two or more commands. In some embodiments, the display manager can adjust the size and/or amount of time the result is displayed. The adjustments can be based on the type of information being displayed, a priority of the command, and/or a relationship between two or more of the received commands. In some embodiments, the display manager uses a learning model (or machine learning, artificial intelligence, etc.) to dynamically allocate screen space for a command. The allocated space can be designated to display a set of information needed to complete the query. The learning model can predict an amount of space needed, relationships between the various commands, and/or an amount of time to display the information.

In some embodiments, the display manager can allocate the same and/or different amount of screen space to each command. In some embodiments, the type of command determines the type of information is necessary to display and/or a relative size that is needed to display. For example, a map showing directions may need to use enough space to adequately display a current location, a next instruction (e.g., turn), and information for when the instruction should be executed (e.g., side streets, estimated time/distance, etc.) If all of this information is put into too small of an area, it can become too small to be useful. In contrast, as an example, displaying the results of a sporting event may only need enough space to display the logo for the participating teams and the final outcome. If the two above examples were being displayed at the same time, the display manager can allocation 80% of the screen to the map and directions, and 20% of the screen to the sporting event outcome.

In some embodiments, the display manager can identify relationships between the various commands. The relations can be based on a confidence score that two or more voice commands are linked in some way. The link/relationship can be of any form. For example, if a user asks for direction to a movie theater, showtimes for that theater, and the weather, the display manager can determine the three commands are linked. The directions, the movie time, and the weather can all affect when the user should leave home to get to the theater at the desired time.

In some embodiments, the display manager can determine a time to display each result. In some embodiments, the display manager can display each result for a period of time. The period of time can be long or short. In some embodiments, the period of time is based on how long it takes a user to adequately glean/understand/view the information from the display. The type of information can affect the amount of time it is displayed. For example, if the request is the result of a sporting event, then a relative short period of time is needed (e.g., 5-10 sec.). If the display is a map, it may be displayed for a relatively longer time (e.g., 2 min). In some embodiments, the time can be based on whether sound is included with the display. For example, if the display includes a video/dialogue, the display will be shown long enough to complete the audio.

In some embodiments, the relationship, the time, and the space needed can be based on historical data. The historical data can be for a particular user, for a group of users, and/or from any other data set. The historical data can be used as training data. In some embodiments, the learning model can be updated based on user feedback and/or newly acquired/updated data.

In some embodiments, the relationships, the time, and the space needed to display results can be based on a set of rules. The rules can be updated/input by the user. Specific rules can be used to prioritize commands, and/or allocate a specified space, time, and/or relationship for various specific/types of commands.

The aforementioned advantages are example advantages, and embodiments exist that can contain all, some, or none of the aforementioned advantages while remaining within the spirit and scope of the present disclosure.

Figure 4:
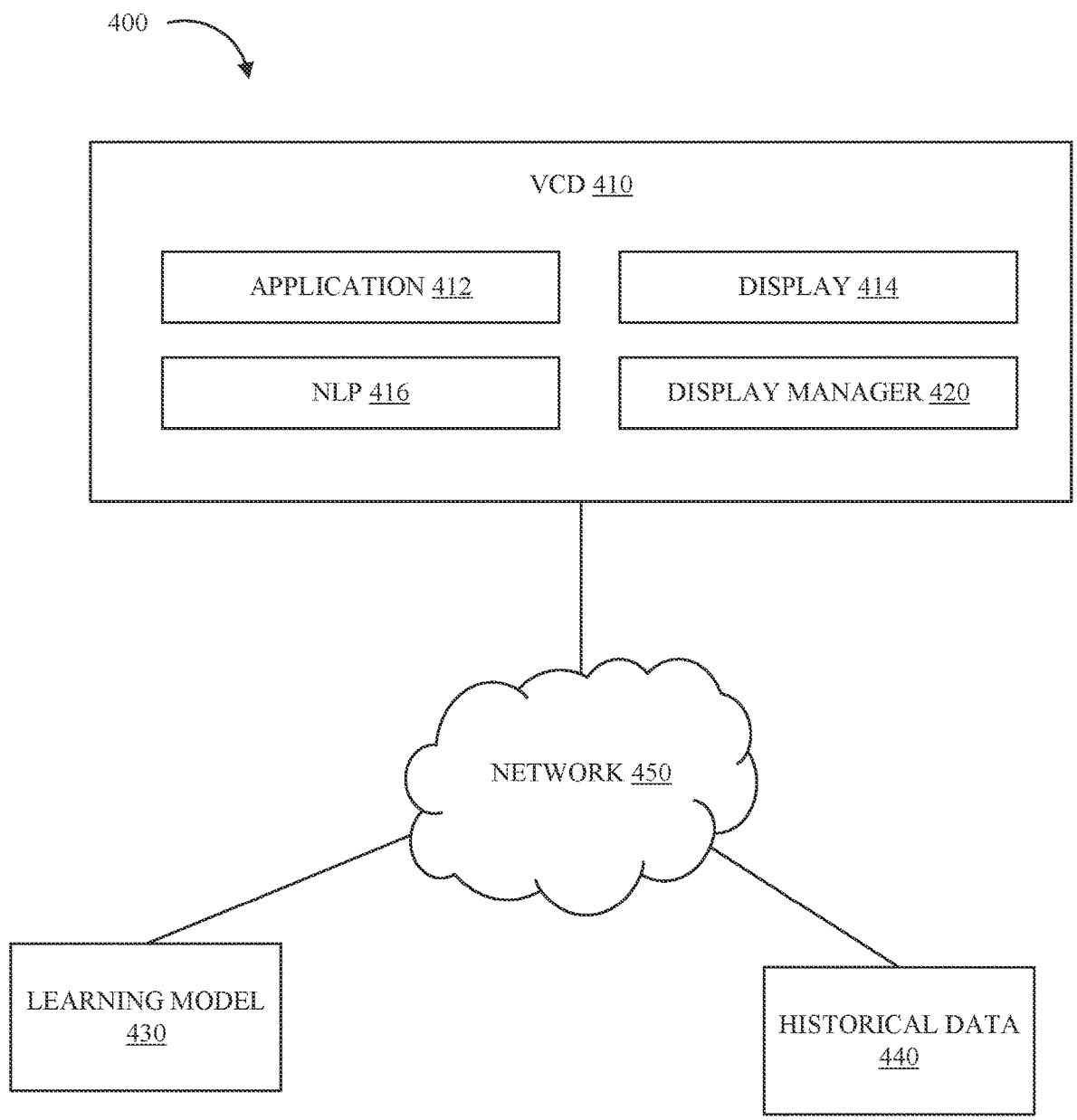
FIG. 4 illustrates a functional diagram of a computing environment suitable for operation of a display manager in accordance with some embodiments of the present disclosure.

Referring now to various embodiments of the disclosure in more detail, FIG. 4 is a representation of a computing environment 400, that is capable of running a display manager in accordance with one or more embodiments of the present disclosure. Many modifications to the depicted environment may be made by those skilled in the art without departing from the scope of the disclosure.

Computing environment 400 includes VCD 410, learning model 430, historical data 440, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between and among VCD 410, learning model 430, historical data 440, and other computing devices (not shown) within computing environment 400. In some embodiments, VCD 410, learning model 430, historical data 440, may include a computer system, such as the data processing system 100 of FIG. 3.

VCD 410 can be a standalone computing device, a management server, a web server, a mobile computing device, or any other electronic device or computing system capable of receiving, sending, and processing data. In other embodiments, VCD 410 can represent a server computing system utilizing multiple computers as a server system, such as in a cloud computing environment (e.g., cloud computing environment 50). In some embodiments, VCD 410 can receive and interpret voice commands from one or more users. The voice commands can be received through a listening device, and be converted to a computer readable format. In some embodiments, natural language processing (NLP) is used to interpret the commands into computer readable form. In some embodiments, known methods and programs can be used to interpret the command. In some embodiments, VCD 410 includes container device manager 412, application 412, display 414, NLP 416, and display manager 420.

In some embodiments, learning model 430 and/or historical data 440 can be included in VCD 410 and/or display manager 420. However, they are shown as separate for discussion purposes.

Application 412 can be any combination of hardware and/or software configured to carry out a function on a computing device (e.g., VCD 410). In some embodiments, application 412 is a web application. In some embodiments, application 412 can be configured to execute a command received by device manager 412 and display the result on a screen/display. For example, application 414 can include one or more of a streaming application (e.g., music, podcast, etc.), a search engine, a weather service, data retrieval system, mapping service, and the like. In some embodiments, application 414 can receive, execute, and return results/perform an event based on the received voice command. In some embodiments, application 414 is integrated into an additional device with a display and/or configured to display results on a remote display.

Display 414 can be any combination of hardware and/or software configured to display results from one or more queries. In some embodiments, display 414 can show the results of two or more commands simultaneously. Each of the two or more commands can be allocated the same or different amounts of screen/display space and/or display time. In some embodiments, the two or more display areas can overlap. For example, one result may utilize the entire display, and a second may cover a portion of the first result.

NLP 416 can be any combination of hardware and/or software configured to interpret voice commands. In some embodiments, NLP 416 can convert a voice command into a computer readable form. In some embodiments, a natural language processing system may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed commands. Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a voice command/document and generate corresponding data structures for one or more portions of the document. For example, in response to receiving a voice command at the natural language processing system, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

Display manager 420 can be any combination of hardware and/or software configured to display results of audible commands on the display of a VCD (e.g., VCD 410). In some embodiments, the display can be on an associated device with a display. In some embodiments, display manager 420 can identify a relationship between two or more commands. The relationship can be based on analyzing the commands. In some embodiments, the relationships is determined by learning model 430. In some embodiments, display manager 420 can manage/display two or more commands. The second/subsequent of the two or more commands can be received before the first is fully processed and the response returned.

In some embodiments, display manager 420 can allocate a portion of the display for the two or more responses. The allocations can be concurrent and/or sequential. The allocation can be determined by learning model 430 and/or based on historical data 440 and the two or more commands.

In some embodiments, display manager 420 can prioritize the two or more responses. The priority can be related to the order of processing and/or the amount of screen allocation. In some embodiments, the relationship between the two or more displays can adjust the priority of the commands. For example, a low priority command can be increased in priority based on being related to a high priority command. In some embodiments, the priority determines the order of processing and/or the size of screen allocation.

In some embodiments, display manager 420 determines an amount of time to display each command response. The time can be based on one or more of the types of response, relationship to other commands, priority, screen allocation, the number of other commands, associated audio and the like. In some embodiments, display manager 420 can alter the size and/or shape of the display area for each command. Display manager 420 can transition between displays. Generally, two or more commands can be displays at one time, but only a single audio feed can be played at time.

In some embodiments, display manager 420 can parse/separate/identify the two or more commands received. The identification can occur even when the two commands are given in a single continuous manner. For example, the user can say "What time does the movie start, and what is the fastest route to the theater, and is it going to snow tonight?" The display manager 420 can receive and interpret the entire string, then parse through the string to identify the multiple commands. In the above example, three different commands can be identified, the movie time, the route, and the weather. In some embodiments, particular words can indicate separate commands. The particular words can be grouped/categorized. For example, words that indicate a question can indicate a command. From the above example, the two "what" and "is it" of the third command can be used to identify the various commands. In some embodiments, the identification can be based on parts of speech. For example, a verb, a noun or combination of the two can be used to identify two or more separate commands in a continuous string of words from a user. In some embodiments, the identification is performed with/by NLP 416. In some embodiments, learning model 430 can be utilized in identifying/separating the various commands.

Learning model 430 can be any combination of hardware and/or software configured to identify relationships between two or more voice commands, allocate display space to display a result from a voice command, and/or determine an amount of time to display the result.

In some embodiments, learning model 430 is configured to analyze historical data 440. The output of learning model 430 can be based on historical data 440 and/or training data. In some embodiments, historical data 440 can include training data for learning model 430. In some embodiments, the learning model 430 accepts and incorporates user feedback. The feedback can be requested from the user and/or received without a request. For example, if a user cancels a command within a predefined time after issuing the command, that cancelation can be used as feedback.

In some embodiments, learning model 430 identifies relationships between two or more commands. The relationship can be any connection between two or more commands. The relationship can include time/location received, past uses of similar commands, category/type of command, proximity to receiving the command, and the like. In some embodiments, learning model can generated a relationship score, the relationship score represents a likelihood two or more commands are related. In some embodiments, related can mean to complete a similar task. For example, a movie time, and directions to a movie theater may have a high relationship score. Another example, a command asking for the price of milk and instruction on car maintenance may have a low relationship score.

In some embodiments, learning model 430 can allocate space to each command. In some embodiments, leaning model can predict/determine a size needed to effectively present the information to the display. An effective presentation is big enough that a typical user can view the information from a typical distance. The effective presentation can be based on the display being used. For example, to display the same data on a smart phone may require a larger percentage of the mobile phone display than the percentage of a large television display. The space needed can be an absolute space (e.g., font size 12 or greater), a relative space (e.g., command A allotted more space than command B) and/or relative screen space (e.g., 40% of the screen).

In some embodiments, learning model 430 can determine a time to display the response. The time can be based on one or more of type of information being displayed, relationship to other commands, number of commands being processed/displayed, predetermined rules, size allocation, sound association, and other similar factors.

In some embodiments, learning model 430 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Historical data 440 can be any combination of hardware and/or software configured to store and compile data related to voice commands. In some embodiments, historical data can store data related to how one or more users interact with one or more VCD's (e.g., VCD 410 in computing environment 400). Historical data 440 can include each command issued to VCD 410, the location the command was generated in, a time, a day, a category, feedback, and other similar data. In some embodiments, historical data 440 can be updated by the user. For example, a user can create rules for voice commands. For example, one rule can prioritize/define a predetermined amount of space/time to display the results of a command type (e.g., sporting event score, directions, etc.). As another example, a rule can link two command types as related. In some embodiments, historical data 440 allows the user to opt in and/or opt out of the type of data collected and analyzed. In some embodiments, historical data 440 includes additional user data. The additional user data can include messaging (e.g., email, text messages, etc.), calendar data, location data (e.g., IoT locates, GPS location, etc.), and other similar data. The additional user data can also include data from different users (e.g., family members, etc.) In some embodiments, historical data 440 acts as and/or include training data for learning model 430. As additional data is added, learning model 430 can be retrained and/or updated.

Figure 5:
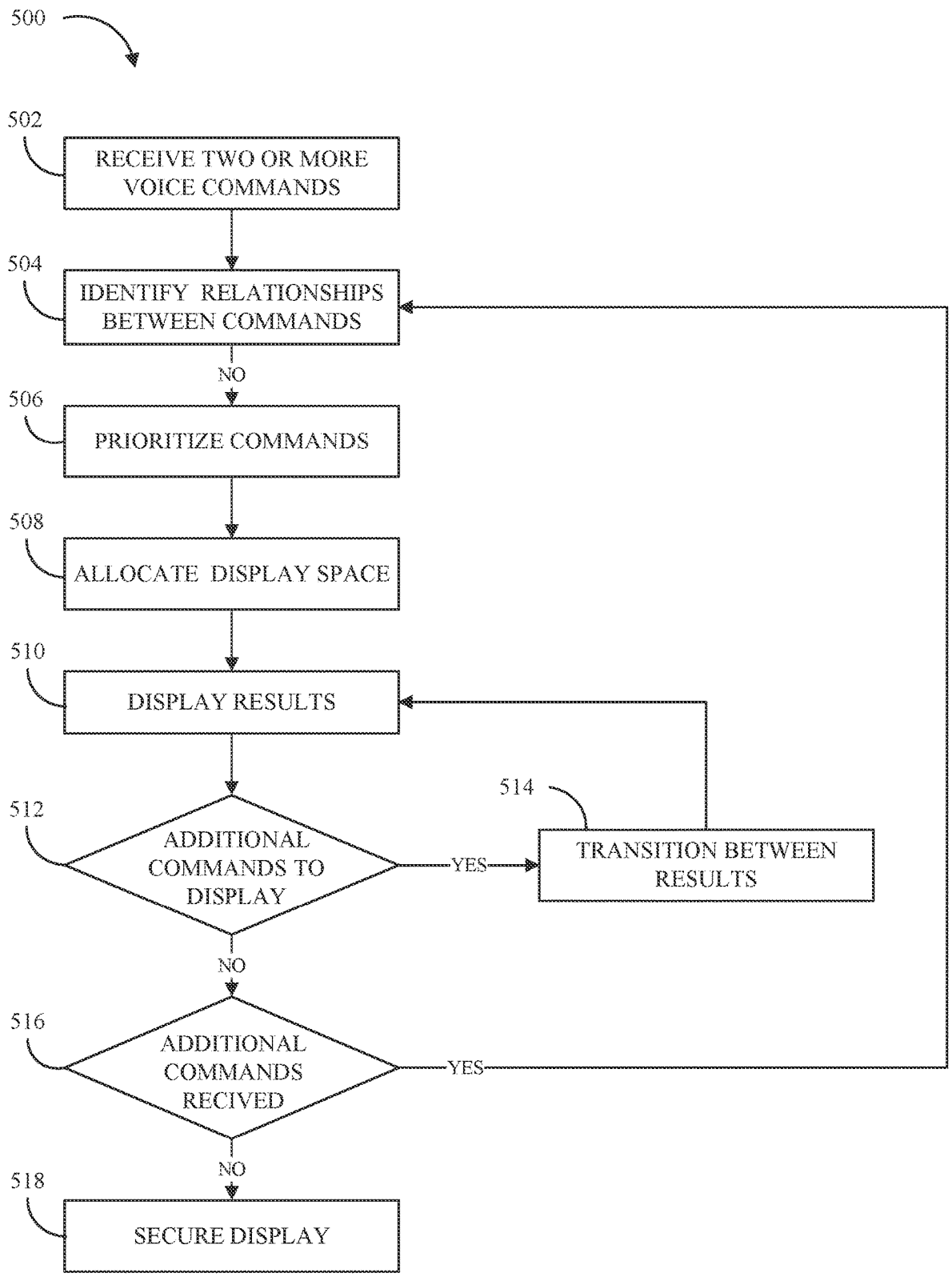
FIG. 5 illustrates a flow chart of an example method to display two or more voice commands concurrently, in accordance with some embodiments of the present disclosure.

FIG. 5 depicts a flowchart of an example method, method 500, for operating display manager 420 that can be performed in a computing environment (e.g., computing environment 400 and/or cloud computing environment 50). One or more of the advantages and improvements described above for allocating display space for two or more voice commands may be realized by method 500, consistent with various embodiments of the present disclosure.

Method 500 can be implemented by one or more processors, VCD 410, application 412, display 414, NLP 416, display manager 420, learning model 430, historical data 440, and/or a different combination of hardware and/or software. In various embodiments, the various operations of method 500 are performed by one or more of VCD 410, application 412, display 414, NLP 416, display manager 420, learning model 430, historical data 440. For illustrative purposes, the method 500 will be described as being performed by display manager 420.

At operation 502, display manager 420 receives two or more voice commands. In some embodiments, the voice commands are received into VCD 410. In some embodiments, each of the two or more voice commands can be completed by displaying data on a device. In some embodiments, at least one of the voice commands includes playing an audio component to fully execute.

At operation 504, display manager 420 identifies relationships between the two or more commands. In some embodiments, the relationships are identified by analyzing the two or more commands. The analysis can be performed by/with learning model 430. In some embodiments, the analysis includes generating a relationship score between each set/group of the commands. The score can represent a likelihood a command is related to another (or a group of other related) commands. In some embodiments, commands can be related if the relationship score exceeds a threshold. The threshold can be static or dynamic. A user can adjust the threshold.

At operation 506, display manager 420 prioritizes the two or more commands. In some embodiments, each of the two or more commands are prioritized. The display manager 420 can generate a priority score/ranking for each command. In some embodiments, the priority is based on one or more of the issuer (e.g., a particular user), time, location (e.g., home vs. automobile), number of commands, relationship to other commands, and the like. As an example, an administrator (e.g., a parent) can set a rule to make their commands higher priority than a basic account (e.g., a child). As another example, a command related for directions received in an automobile can be given a higher priority relative to the same command received at home. As a third example, if a first command has a relatively low priority, but is related to a highest priority command, then the first command priority can be increased based on the relationship.

There can be multiple types of priority. For example, display manager 420 can generate an issuer priority, a location priority, and a relationship priority score. Then the three scores can be combined, either weighted or unweighted, to for an overall priority score.

At operation 508, display manager 420 allocates display space to at least one of the two or more received voice commands. In some embodiments, the display allocation can be determined by analyzing historical data 440 and/or rules. The analysis can be performed by/with learning model 430. In some embodiments, display space is allocated for at least two commands. In some embodiments, the amount of display space allocated is configured to be sufficient to adequately portray the information to the user.

The allocation can be based on the priority score and/or relationship score. For example, a command with the highest overall priority (or a specific category priority) can be the first command to be allocated display space. In some embodiments, the allocation of display space is for two or more related commands. The second command can be related to the first command, even if it has a lower priority than a command not allocated screen space. There can be a third unrelated command allocated space. In some embodiments, additional commands can be displayed if there is additional display space. If there is no additional command, the allocation of the remaining displays can be increased. In some embodiments, the allocation can be determined for each of the received commands. This can include transitions between multiple commands (e.g., as displayed results are replaced).

In various embodiments, the space allocated to each command can be the same and/or different. The space can also be overlapping. For example, a first command can include driving directions which are allocated to the entire display, and a second command can be a sporting event result that is allocated a small corner of the display overlapping a portion of the map. This same example can also be considered to allocate more space to the map, and the smaller corner space to the result.

In some embodiments, operation 508 includes determining a display time. The display time can be a length of time to show the visual response on the display. In some embodiments, the display time can be determined by analyzing historical data 440 and/or rules. The analysis can be performed by/with learning model 430.

At operation 510, display manager 420 displays the selected results. The results can be displayed in the space allocated for the time allocated. In some embodiments, a sound can be associated with one of the results and the sound played while the result is displayed.

At operation 512, display manager 420 determines if there are additional results to display. In some embodiments, there are additional results to display if the commands have been received, require a display to complete, and have not been completed. If it is determined there are additional commands to display (512:YES), then display manager 420 proceeds to operation 514. If it is determined there are no additional commands to display (512:NO), then display manager 420 proceeds to operation 516.

At operation 514, display manager 420 transitions between command results. The previously displayed result can be removed and the display space can be allocated to the new results. In some embodiments, the size of the allocation can be altered during the transitions. For example, a first and a second result can each be allocated 50% of the display. The display space allocated for the second result can be transitioned to the third result. Additionally, the allocation for each displayed response can change so the first result occupies 75% of the display, and the third result occupies 25% of the display. In some embodiments, the transition can be included in operation 510. Upon completion of operation 514, display manager 420 returns to operation 510. The display can be for the transitioned to results.

At operation 516, display manager 420 determines if additional commands are received. The receipt can be at any time before all the received commands are completed and displayed. If it is determined that additional commands are received (516:YES), then display manager 420 return to operation 504. If it is determined there are no additional commands received (516:NO), then display manager 420 proceeds to operation 518. At operation 518, display manager 420 secures the display.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a voice controlled device (VCD), two or more voice commands including a first voice command, a second voice command, and a third voice command, wherein a result for each of the two or more voice commands, including a first result for the first command and a second result for the second command, are configured to be displayed on a screen associated with the VCD the first voice command and the second voice command are independently executable, the first voice command and the second voice command are received from a common user, and each of the two or more commands are received concurrently, wherein concurrently is defined as receiving a subsequent voice command before first voice command is fully executed;
determining the first result for the first command and the second result for the second command;
identifying a first relationship between the first voice command and the second voice command, wherein the first relationship is based on the first result of the first voice command and the second result of the second voice command being related to a common task;
prioritizing each of the two or more commands, wherein the first command is a highest priority command, the second command is a third priority command;
adjusting, in response to the identifying the relationship between the first command and the second command, a priority of the second command to a second priority, wherein the displaying is based on the first command and the second command being the first and second priority commands;
allocating, in response to the identifying and based on the first relationship, a portion of the screen for each command to be displayed concurrently including, a first allocation for the first result of the first voice command and a second allocation for the second result of the second voice command, wherein each allocation includes an amount of the screen to display the first result and the second result; and
displaying, based on the first allocation and the second allocation, the first result and the second result concurrently on the screen.

2. The method of claim 1, wherein the two or more voice commands includes a third voice command and the second voice command has a lower priority than the third voice command.

3. The method of claim 2, wherein the displaying the first result and the second result simultaneously is based on a relationship score for the first result and the second result being above a relationship threshold.

4. The method of claim 2, wherein the allocating includes determining, for each command, a display time including a second display time for the second result, wherein the display time is configured to allow a source of the command time to view each result on the screen.

5. The method of claim 4, further comprising:
transitioning, in response to the second result being displayed for the second display time, the second result to the third result.

6. The method of claim 5, wherein the transitioning includes changing the first allocation.

7. The method of claim 6, wherein the changing the first allocation is based on a third allocation for the third result being smaller than the second allocation.

8. The method of claim 1, further comprising:
receiving an additional voice command; and
adjusting, in response to displaying the first result and to receiving the additional voice command, the priority of each command.

9. The method of claim 1, wherein the first allocation is greater than the second allocation based on the first command being the highest priority command.

10. The method of claim 1, wherein the first allocation and the second allocation are equal.

11. A system comprising:
a processor; and
a computer-readable storage medium communicatively coupled to the processor and storing program instructions which, when executed by the processor, are configured to cause the processor to:
receive, by a voice controlled device (VCD), two or more voice commands including a first voice command, a second voice command, and a third voice command, wherein a result for each of the two or more voice commands can be displayed on a screen associated with the VCD;
allocate a portion of the screen for each command including, a first allocation for a first result of the first voice command and a second allocation for a second result of the second voice command;
identify a first relationship between the first command and the second command, wherein the first relationship is based on the first result of the first voice command and the second result of the second voice command being related to a common task;
prioritizing each of the two or more commands, wherein the first command is a highest priority command, and the second voice command has a lower priority than the third voice command, and the VCD is configured to display the results based on the prioritizing of the results; and
display, based on the first allocation and the second allocation, the first result and the second result concurrently on the screen.

12. The system of claim 11, wherein each of the two or more voice commands are received concurrently, wherein concurrently is receiving a subsequent voice command before the first voice command is fully executed.

13. The system of claim 11, wherein the displaying the first result and the second result simultaneously is based on a relationship score for the first result and the second result being above a relationship threshold.

14. The system of claim 11, wherein the allocating includes determining, for each command, a display time including a second display time for the second result, wherein the display time is configured to allow a source of the command time to view each result on the screen.

15. A computer program product, the computer program product comprising a computer readable storage medium having program instructions embodied therewith, the program instructions executable by a processing unit to cause the processing unit to:
receive, by a voice controlled device (VCD), two or more voice commands including a first voice command and a second voice command, wherein a first result and a second result for each of the two or more voice commands, respectively, are configured to be displayed on a screen associated with the VCD, the first voice command and the second voice command can be independently executed, and the first voice command and the second voice command are received from a common user;

determine the first result for the first command and the second result for the second command;

identify a first relationship between the first command and the second command, wherein the first relationship is based on the first result of the first voice command and the second result of the second voice command being related to a common task;

prioritizing each of the two or more commands, wherein the first command is a highest priority command;

allocate, in response to the identification and based on the first relationship, a portion of the screen for each command including, a first allocation for the first result of the first voice command and a second allocation for the second result of the second voice command, wherein each allocation includes an amount of the screen to display the first result and the second result, and the first allocation is greater than the second allocation based on the first command being the highest priority command; and display, based on the first allocation and the second allocation, the first result and the second result concurrently on the screen.

16. The computer program product of claim 15, wherein each of the two or more voice commands are received in concurrently, concurrently is receiving a subsequent voice command before the first voice command is fully executed, and the program instructions are further configured to cause the processing unit to:

identify relationships between the two or more voice commands; and prioritize each of the two or more voice commands, wherein the first voice command is a highest priority command.

17. The computer program product of claim of claim 16, wherein the two or more commands include a third command, and the second voice command has a lower priority than the third command.

18. The computer program product of claim of claim 17, wherein the displaying the first result and the second result simultaneously is based on a relationship score for the first result and the second result being above a relationship threshold.

* * * * *